US008372467B2

(12) United States Patent
Caridis et al.

(10) Patent No.: US 8,372,467 B2
(45) Date of Patent: *Feb. 12, 2013

(54) UNIVERSAL POTATO CHIP COOKER

(75) Inventors: Andrew A. Caridis, San Carlos, CA (US); John Macrae Silvester, Stanthorpe (AU); Anthony Wade Morris, San Carlos, CA (US); Thomas John Miller, Burlingame, CA (US); Enrique Alejandro Leon, Jalisco (MX)

(73) Assignee: Heat and Control, Inc., Hayward, CA (US)

( * ) Notice: Subject to any disclaimer, the term of this patent is extended or adjusted under 35 U.S.C. 154(b) by 317 days.

This patent is subject to a terminal disclaimer.

(21) Appl. No.: 12/220,122

(22) Filed: Jul. 22, 2008

(65) Prior Publication Data

US 2010/0021602 A1    Jan. 28, 2010

(51) Int. Cl.
*A23L 1/01* (2006.01)

(52) U.S. Cl. ........ 426/637; 426/438; 426/465; 426/523; 426/808; 99/405; 99/409

(58) Field of Classification Search ................ 426/637, 426/438, 441, 523, 465, 466, 808; 99/403–407, 99/409
See application file for complete search history.

(56) References Cited

U.S. PATENT DOCUMENTS

| | | | | | |
|---|---|---|---|---|---|
| 2,174,556 | A | * | 10/1939 | Ferry | 99/405 |
| 3,026,885 | A | * | 3/1962 | Eytinge | 134/157 |
| 3,794,745 | A | * | 2/1974 | Boertje et al. | 426/439 |
| 4,741,912 | A | * | 5/1988 | Katz et al. | 426/438 |
| 4,844,930 | A | * | 7/1989 | Mottur et al. | 426/438 |
| 4,863,750 | A | * | 9/1989 | Pawlak et al. | 426/438 |
| 4,867,049 | A | * | 9/1989 | Johnson | 99/330 |
| 4,929,461 | A | * | 5/1990 | Schonauer et al. | 426/438 |
| 5,112,633 | A | * | 5/1992 | Benson et al. | 426/438 |
| 5,137,740 | A | * | 8/1992 | Benson et al. | 426/438 |
| 7,303,777 | B2 | * | 12/2007 | Baas et al. | 426/428 |
| 2004/0166210 | A1 | * | 8/2004 | Barry et al. | 426/243 |
| 2006/0019007 | A1 | * | 1/2006 | Baas et al. | 426/438 |
| 2009/0274810 | A1 | * | 11/2009 | Caridis et al. | 426/438 |

* cited by examiner

*Primary Examiner* — Drew E Becker
(74) *Attorney, Agent, or Firm* — Donald N. Macintosh

(57) ABSTRACT

Potato chip cooking process and apparatus includes controlled cooking of potato slices from the initial to the final cooking stages. Slices are deposited in hot cooking oil to develop a slice pack which is carried along a cooking path during which the pack is agitated and mixed by paddle means or tumbled so that the individual slices receive maximum contact with the cooking medium. The cooking path may be divided into one or more stages in each of which the cooking times and temperatures are selected and maintained to produce potato chips of different styles having a final moisture content in the range of 1.2% to 2%. Further disclosed are apparatus that includes temperature and oil circulation controls for the oil heat exchangers dedicated to each stage of a cooking protocol. A multiplicity of variable rate, rotatable paddle wheel assemblies are positioned along the cooking path for thorough agitation of the potato pack encouraging good oil contact with the individual slices and consistent, chip-to-chip final moisture content.

11 Claims, 16 Drawing Sheets

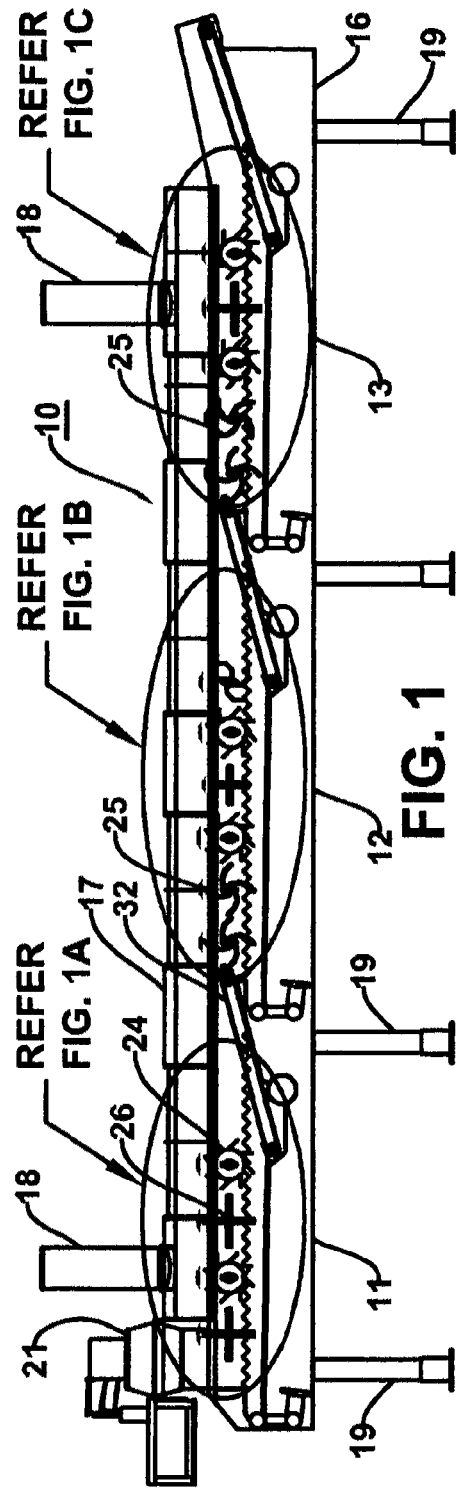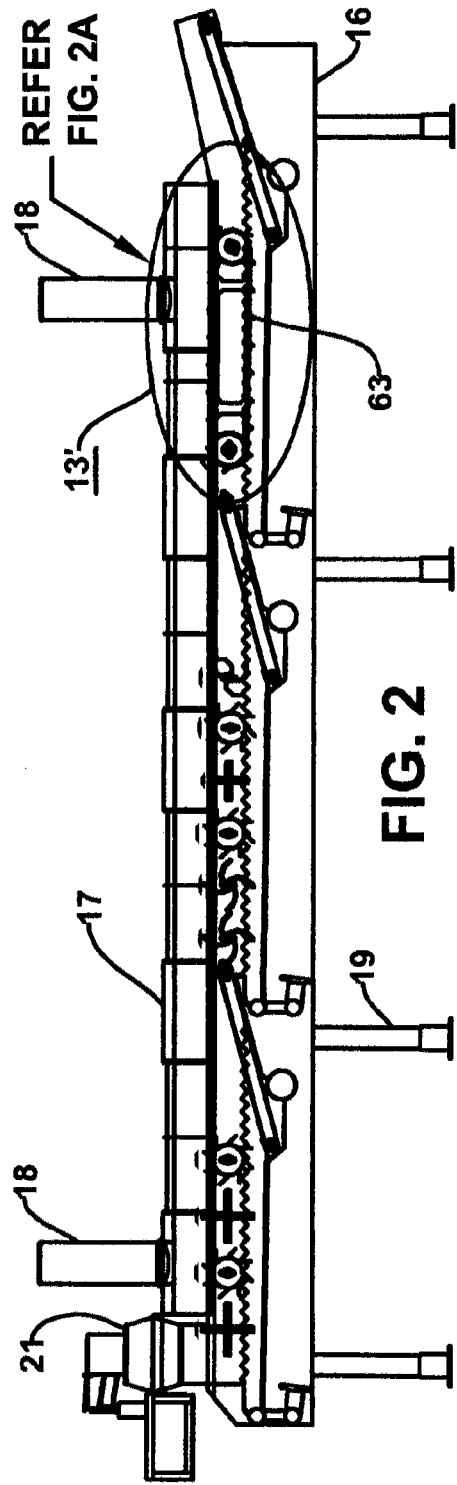

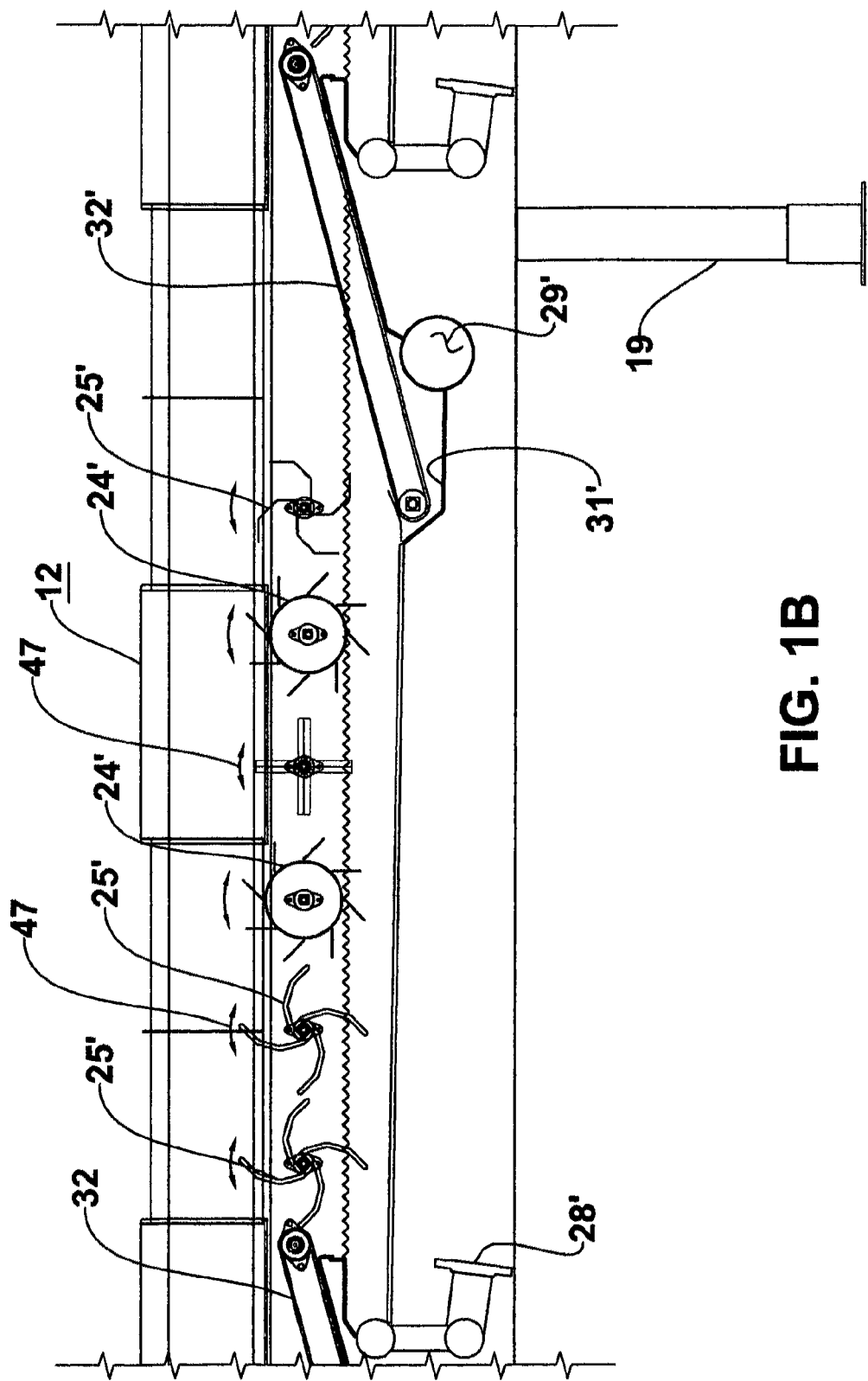

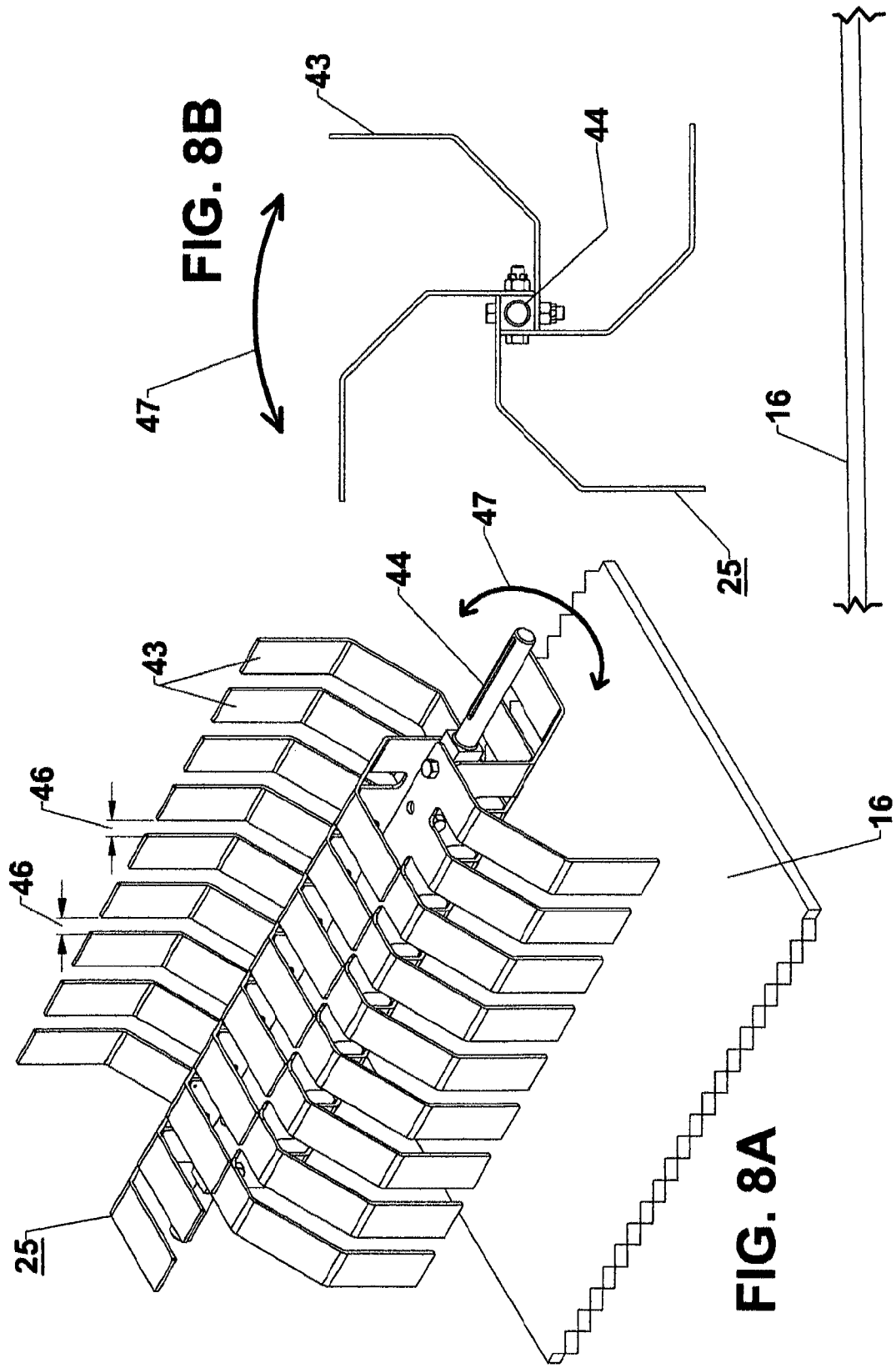

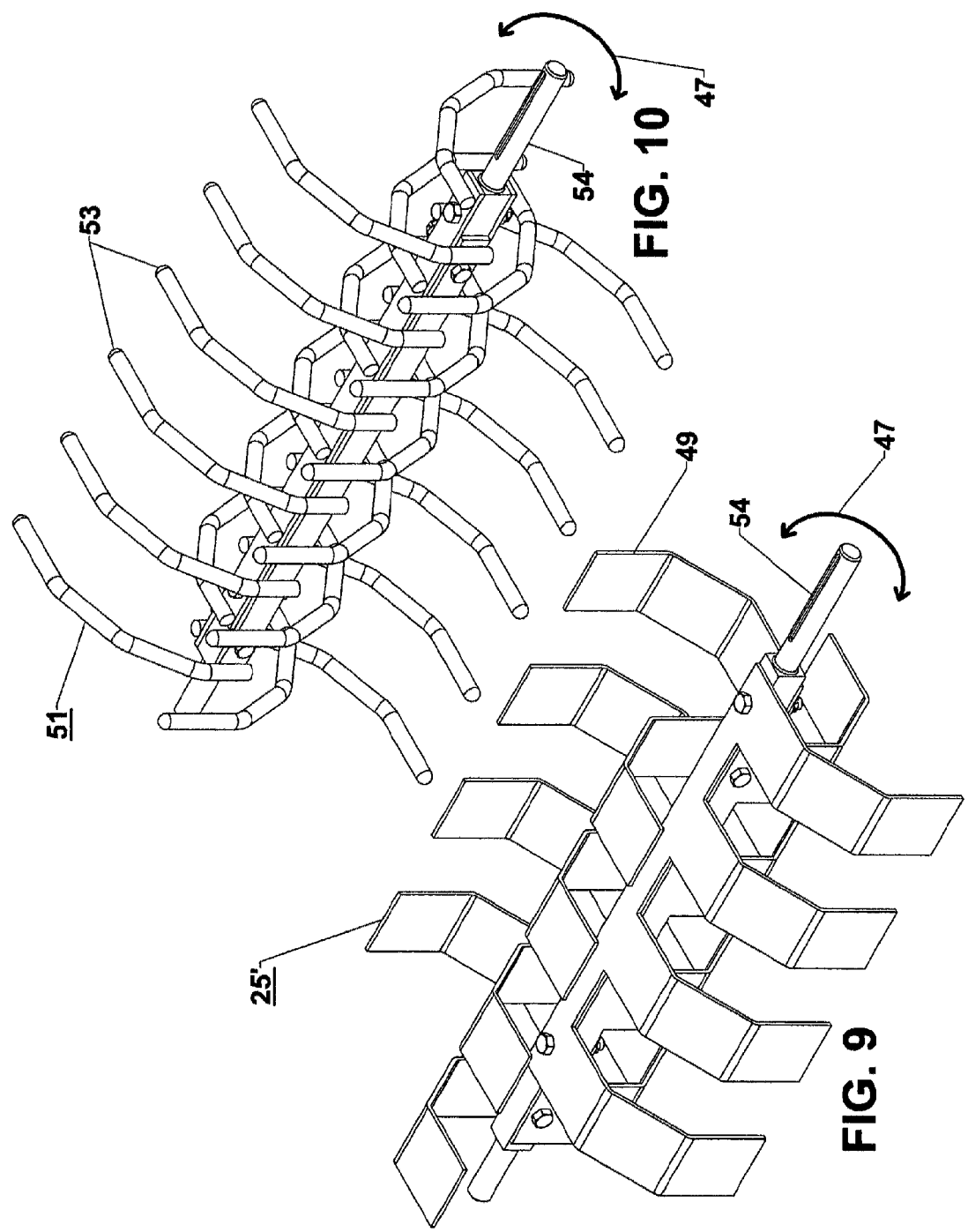

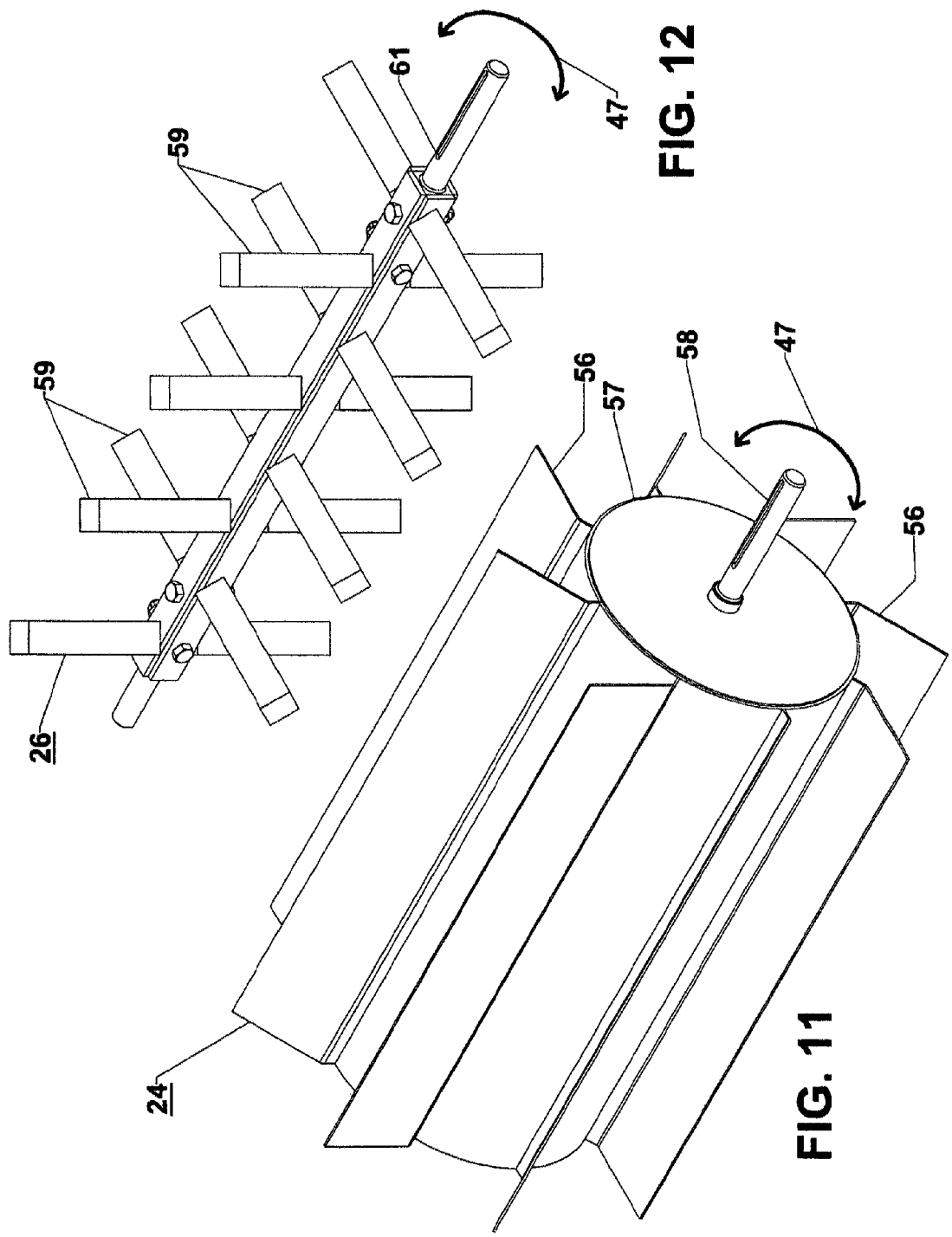

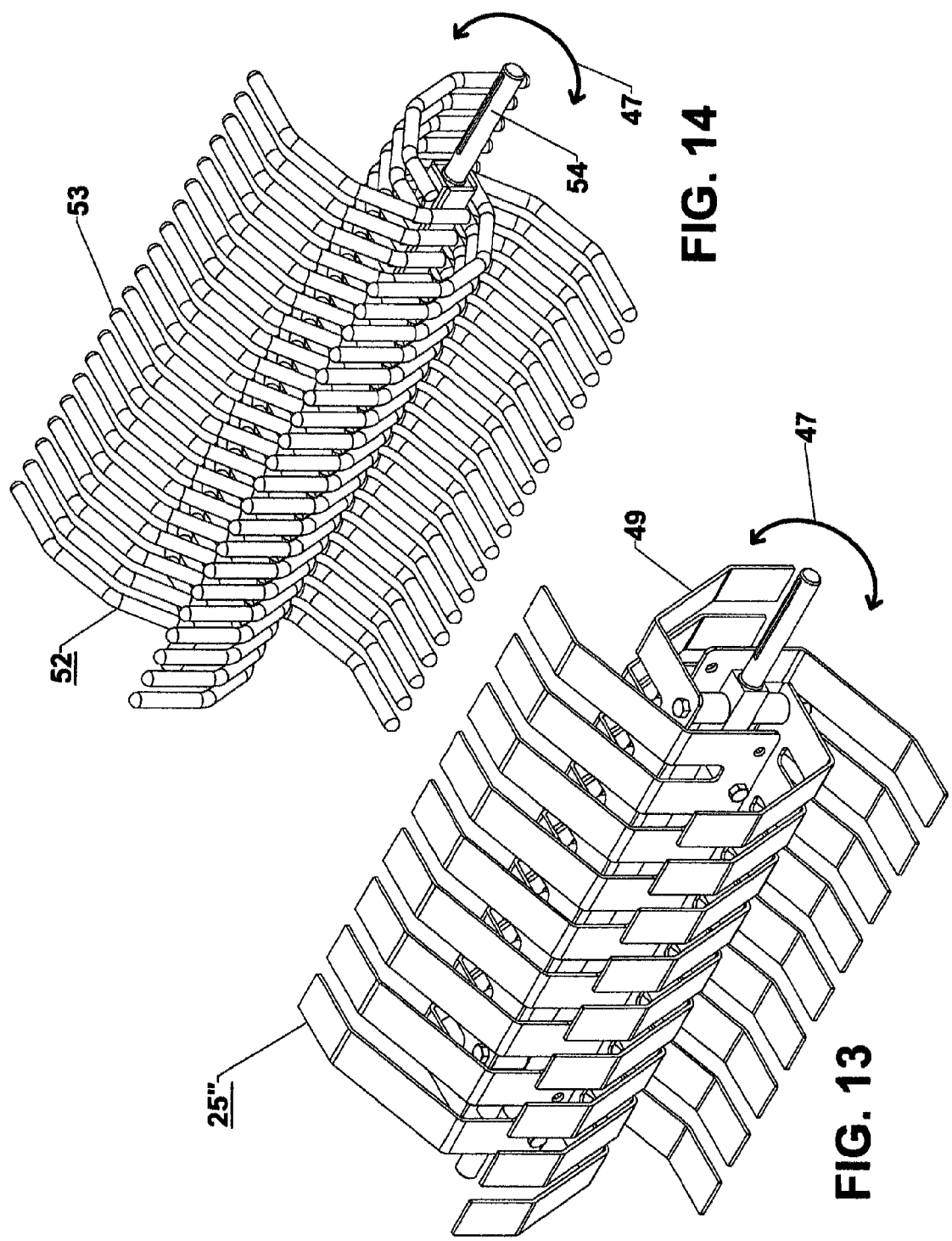

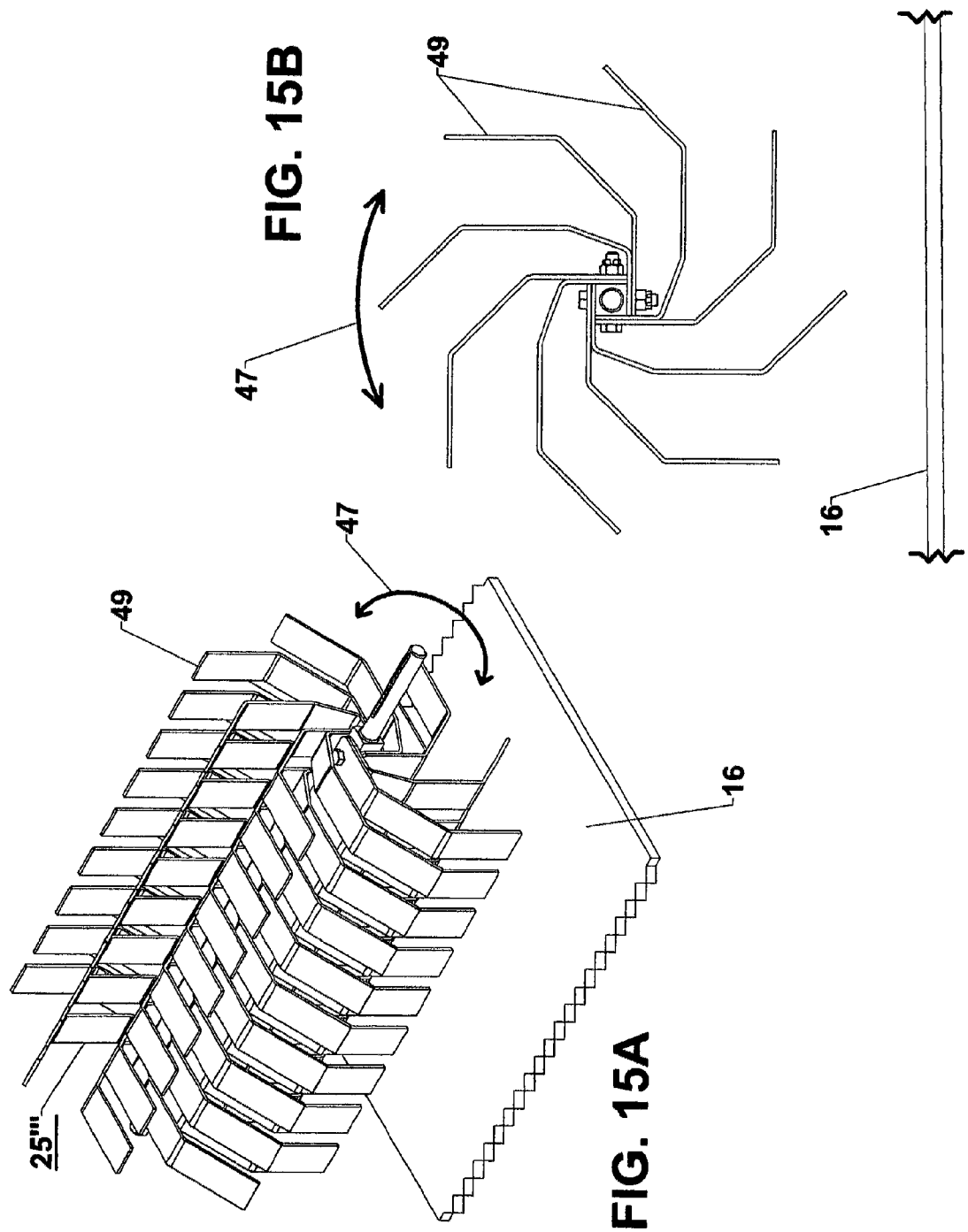

UNIVERSAL POTATO CHIP COOKER

FIELD OF THE INVENTION

This invention relates to cooking potato chips in apparatus and process that are flexible to an extent that varieties of chips may be produced in a continuous manner, by employing highly sensitive temperature controls and product movement controls, ranging from the standard chip to the "hard bite" or kettle style potato chip.

BACKGROUND OF THE INVENTION AND THE PRIOR ART

Traditionally, potato chip production has been conducted in cookers dedicated to a specific type or style of chip ranging from a traditional standard bite chip widely accepted in the market place to a harder chip such as produced in a kettle or in a continuous potato chip cooker. The general characteristics of a variety of potato chips are disclosed in U.S. Pat. No. 5,137,740, columns 2-4. Should a producer wish to change over from producing one style of chip to another he could face a substantial capital investment in substituting different production equipment or in making extensive modifications to his existing equipment. Neither of these alternatives is financially attractive so much so that usually the producer continues on with his dedicated equipment or purchases an entire new line of equipment to make a different style of potato chip.

Forward thinking equipment manufactures as well as potato chip producers disclosed apparatus and systems affording improved control over the potato chip cooking process. U.S. Pat. No. 5,137,740 to Benson, et al. taught removing moisture from cooking oil at multiple locations along a continuous cooking path and re-introducing the cooking oil into the cooker at different temperatures so as to simulate a desired time-temperature profile within the potato chip cooker. See also U.S. Pat. Nos. 4,738,193 and 4,942,808, these three patents being owned by Heat and Control, Inc. the assignee of the present invention. Process controls over cooking oil temperatures through injection of cooling oil into a continuous cooker and subsequently injecting hot oil is taught in U.S. Pat. No. 7,303,777. There, the objective was to emulate in a continuous cooker the "U" shaped time-temperature cooking curve found in the batch kettle fryers for cooking the hard bite chip. Control of product movement through a snack food cooker by use of "dunker conveyors" and "paddles" is taught in U.S. Pat. Nos. 6,865,983 and 5,580,598. There, rotatable paddles served to restrain product free movement against the velocity of the cooking oil while the dunker conveyors served to depress the products into the cooking oil bath avoiding product float while promoting more through product cooking. A long sought after and desirable goal of potato chip producers has been to obtain a high level of consistency in appearance, moisture and chip oil content from chip to chip. Where the moisture content in the finished chip is controlled to the desired end point, the commercial shelf life of the product is controlled so the ultimate consumer can rely upon buying and enjoying a predictably good product.

SUMMARY AND OBJECTS OF THE INVENTION

In summary, the invention in its broad aspect comprises a potato chip cooker configured to contain multiple separate cooking oil baths so as afford multiple, distinct cooking stages. Each cooking stage is equipped with independent oil heating, oil circulating and temperature control means. Further, each stage is equipped with multiple means for vigorously agitating, mixing and stirring the pack of potato slices in such stage at selected agitation rates and selected durations so as to produce finished potato chips with substantial uniformity in moisture content and appearance irrespective of the style of chip cooked.

A general object of this invention is to provide a flexible system for cooking potato chips of several distinct styles to a high standard of uniformity thus insuring commercial acceptance and a long shelf life of the packaged chips.

Another object of the invention is to provide a continuous cooking system adaptable for accommodating a wide variety of potato chip products, each having dissimilar time-temperature cooking profiles, yet not following the known "U" shaped curve of time and temperature when cooking hard bite or other potato chips.

Yet another object of the invention is to provide for a multi-product cooking system which has multiple oil baths wherein only one or a few of the oil baths may be used at a time.

Still another object of the invention is to provide an improved potato chip cooking system which has variable speed product agitation, stirring, mixing and impulsion units to accommodate a wide range of cooking times as products move through the cooking system.

These and other objects of be present invention will be apparent from the following description of the preferred embodiments taken with the drawings.

BRIEF DESCRIPTION OF THE DRAWINGS

FIG. 1 is an elevation view, partially in section, of a preferred cooking apparatus for carrying out this invention;

FIG. 1B is an enlarged view of the encircled portion designated 1B in FIG. 1 and illustrating apparatus desirable to perform the cooking steps included in stage II of the invention;

FIG. 2 is a view like FIG. 1 but illustrating a submerger conveyor for controlling the potato slice pack in stage III of the invention;

FIGS. 8 through 15 are views, principally in perspective, of 8 different constructions of rotatable paddles, both agitation and controlling paddles, useful in the present invention:

DESCRIPTION OF THE PREFERRED EMBODIMENTS

Figure 1A:
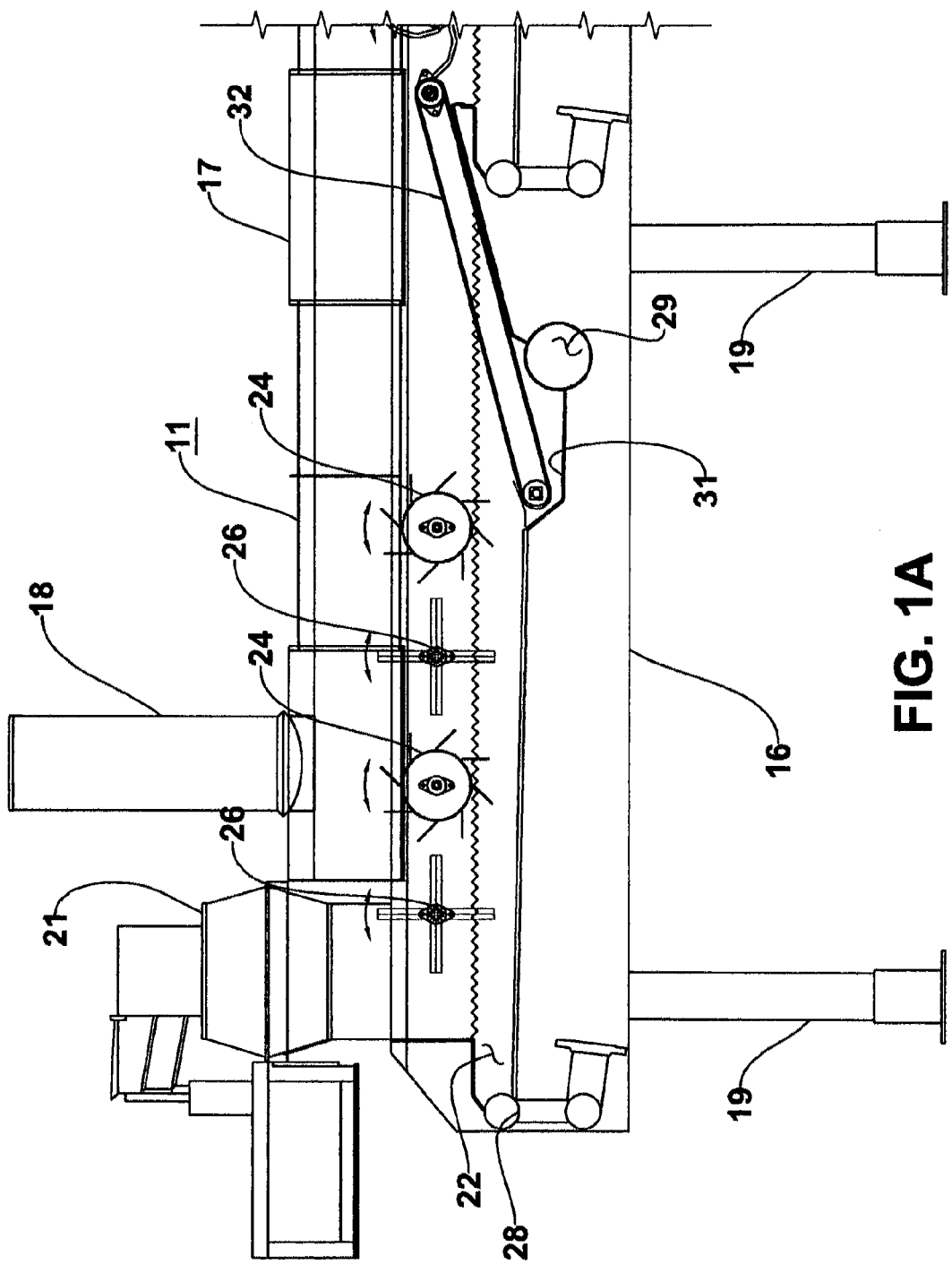
FIG. 1A is an enlarged view of the encircled portion designated 1A of FIG. 1 and illustrating apparatus desirable to perform the cooking steps included in stage I of the invention.
Figure 1C:
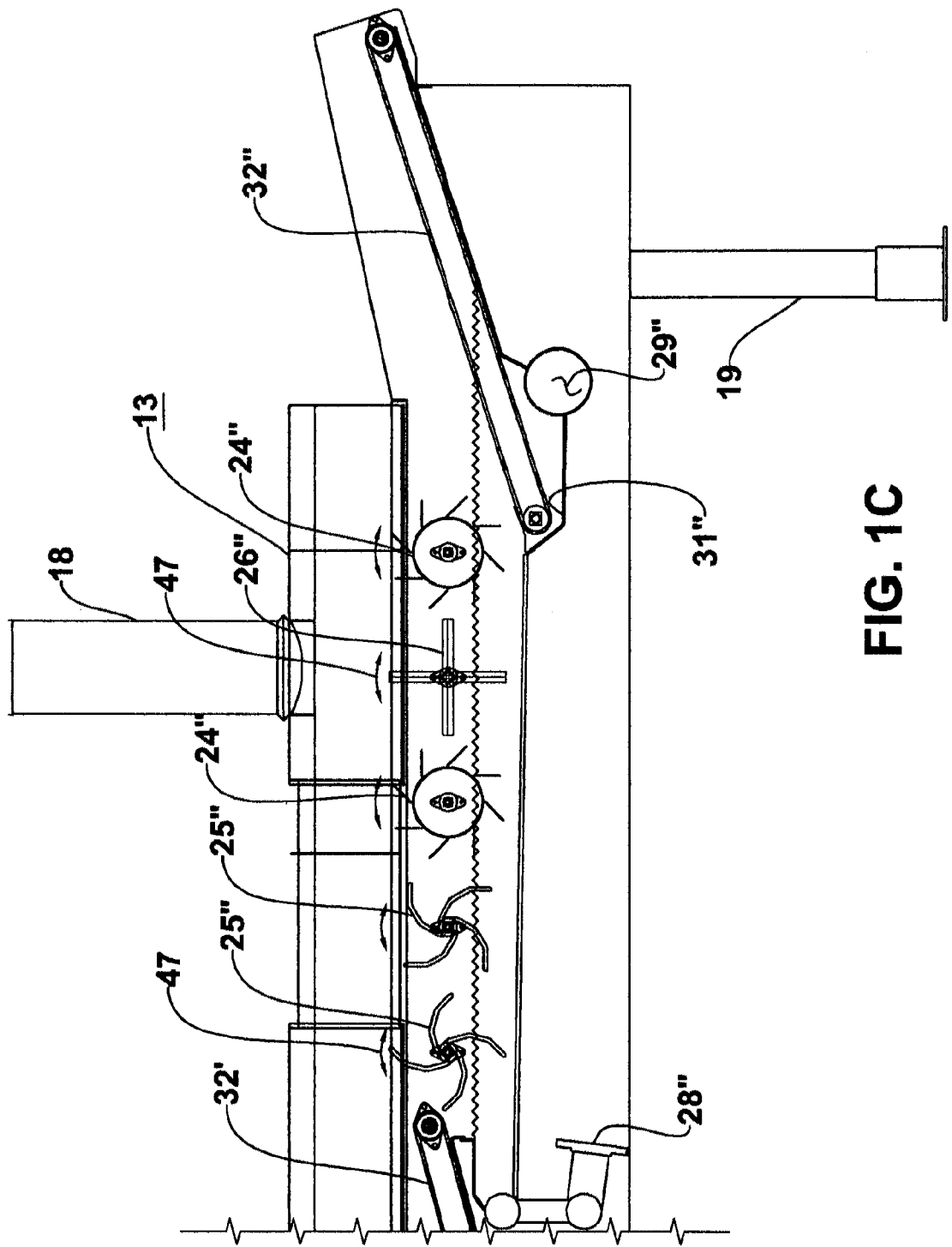
FIG. 1C is an enlarged view of the encircled portion designated 1C in FIG. 1 and illustrating apparatus desirable to perform the cooking steps included in stage III of the invention.

A potato chip cooker 10 configured in accordance with the present invention and operable to performing the processes of the present invention is shown in the drawings and referring to FIG. 1 includes, for example, three stages: a first stage 11, shown in FIG. 1A; a second stage 12, shown in FIG. 1B and a third stage 13, shown in FIG. 1C. The depiction, explanation and discussion of these three stages herein is meant to be exemplary and not by way of a limitation of the present invention. This is deemed a convenient way to refer to the treatment of the potato chip pack 14, see FIGS. 5-7, as the pack is advanced sequentially through the cooker 10 along the product cooking path which in the drawings, FIGS. 1-2, is from left to right.

In each stage the potato chip pack 14 is immersed in a discrete bath of hot cooking oil and maintained in the hot oil for a pre-selected time, the oil being maintained at a desired pre-selected temperature. Similarly, the pack 14 in each stage is subjected vigorously to stirring wherein the chips are separated, agitated, mixed and tumbled to achieve maximum exposure to the cooking oil, thus increasing the chip cooking rate. Viewed another way, the foregoing vigorous stirring serves to evaporate product water carried by the pack both externally from the chip surfaces and internally from within the chips leading to more uniform cooking chip-to-chip and virtual elimination of chip-to-chip "clumping." The later is a common industry phenomena wherein a group of two or more potato chips fasten themselves together somewhere along the cooking path and in the end this results in a potato chip clump which must be detected and removed from the finished product.

The potato chip cooker 10 may be formed in a single longitudinally extending pan 16 embracing all three stages 11-13 or the cooker may be configured from multiple pan units (not shown) containing the subject stages. A vapor containment hood 17 extending the full length of the pan 16 confines any mist of steam and cooking oil generated in the cooking process to the cooker itself and exhaust stacks 18 control and direct the mist to the out of doors. Vertical leg supports 19 maintain the cooker at a height complimentary to that of other production units (not shown) in the potato chip cooking line.

Figure 3:
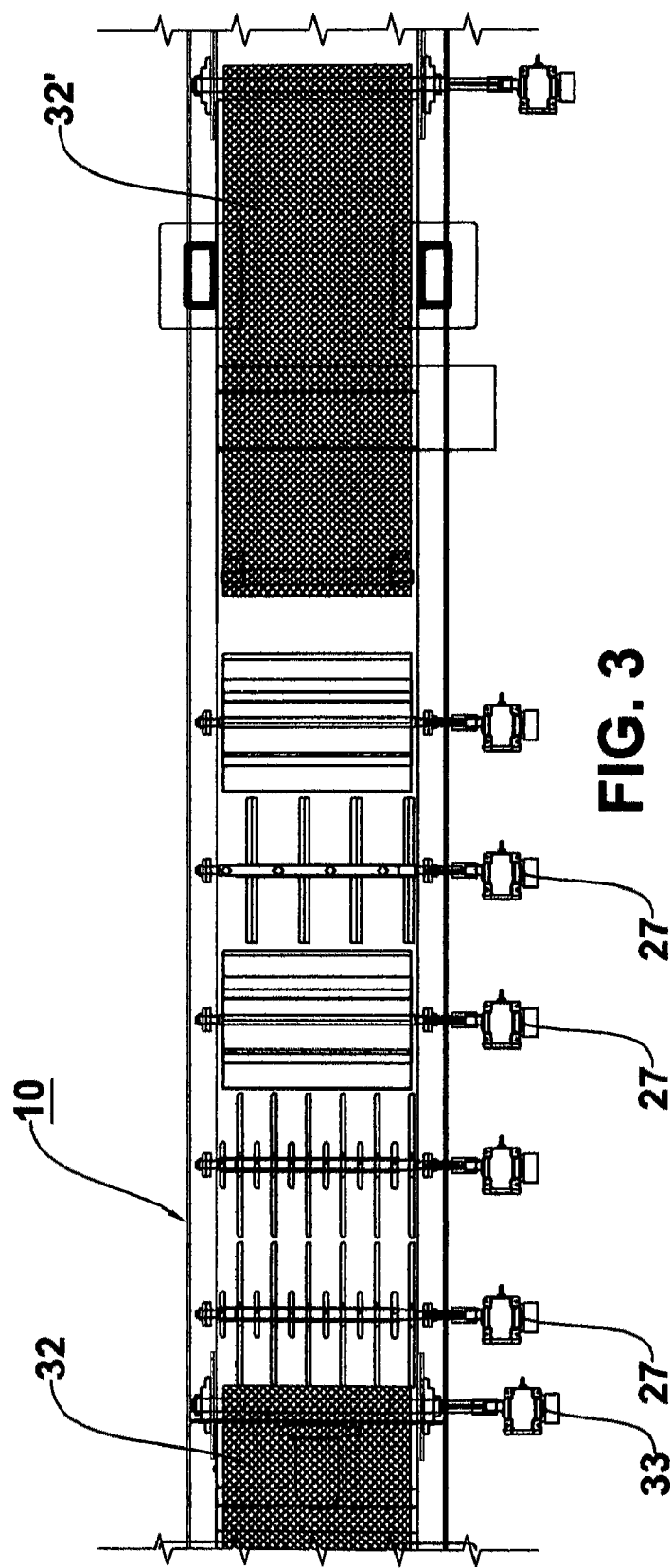
FIG. 3 is a plan view of a section of the FIG. 1 cooking apparatus but with the hood of the cooker removed.
Figure 6:
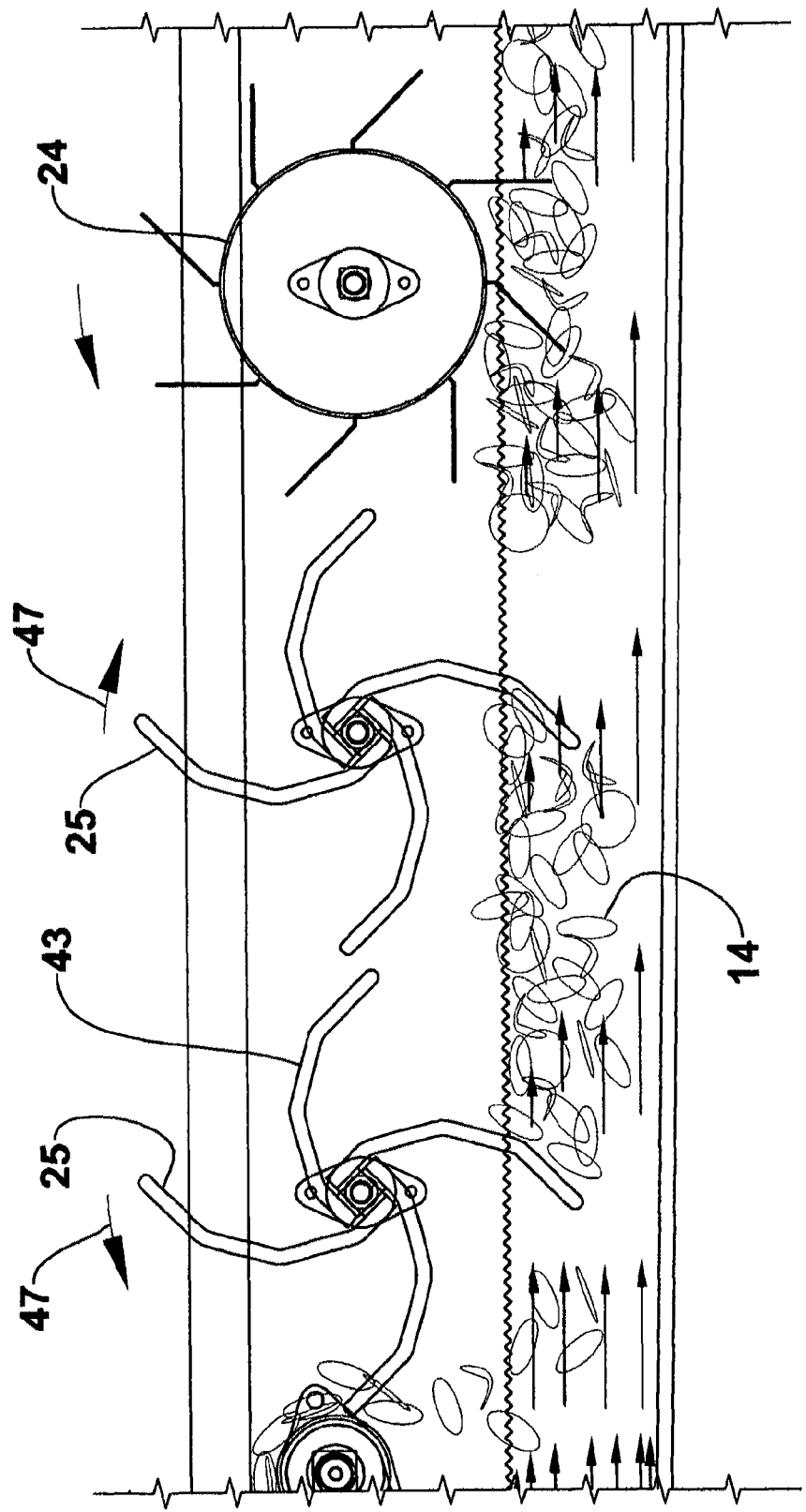
FIG. 6 is greatly enlarged fragmentary elevation view depicting the vigorous agitating and mixing action of the paddles upon the chip pack.
Figure 7:
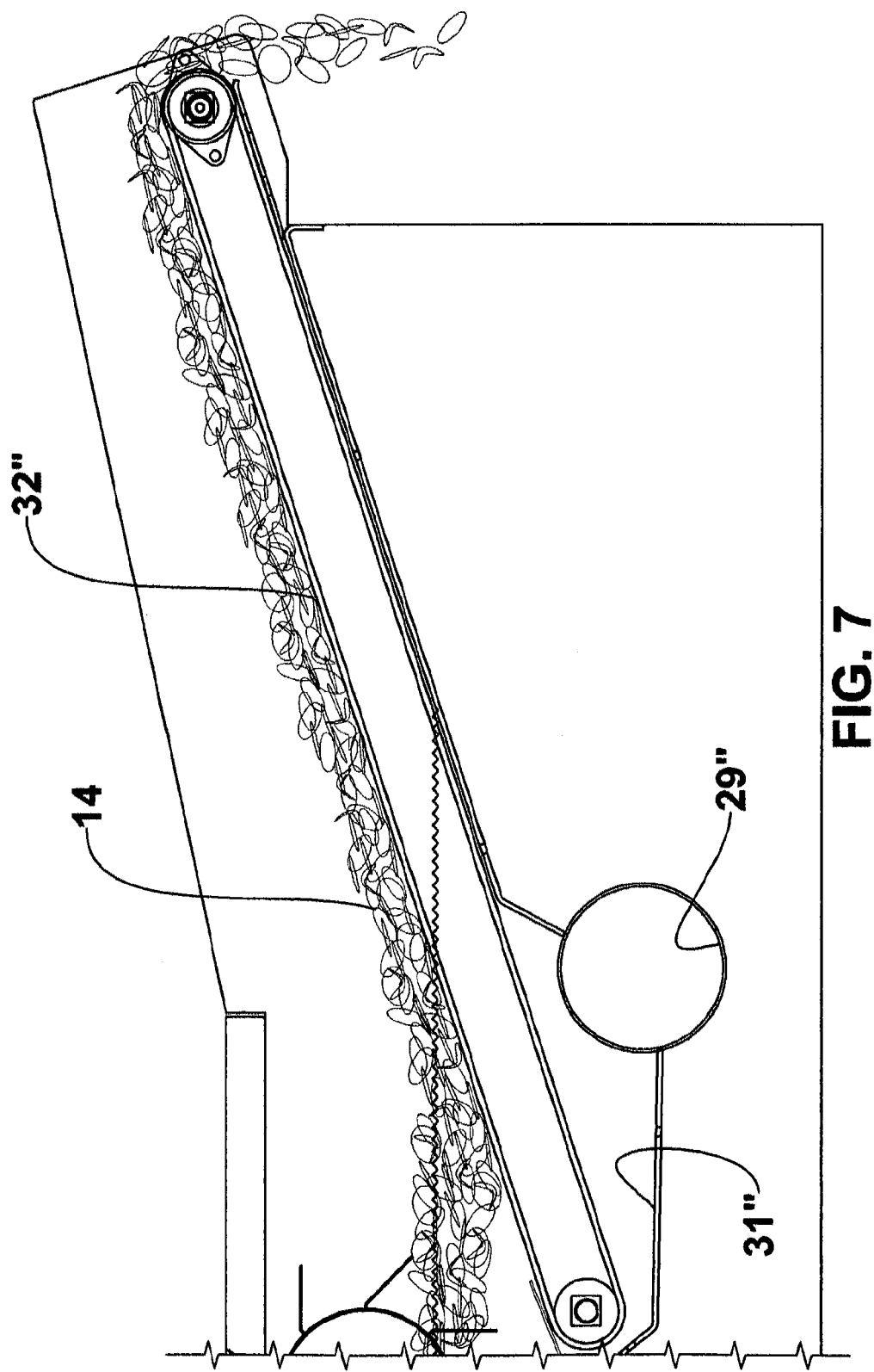
FIG. 7 is a view like FIG. 6 but depicting the discharge of the chip pack from stage III of the apparatus of FIG. 1.

A potato slicer 21 of a rotary type well known in the art may be arranged with respect to the cooker to discharge potato slices directly into the hot cooking oil 22 as shown in FIG. 1A. Alternatively, the potato slices, washed or unwashed, peeled or unpeeled, may be first deposited on a moving belt (not shown) and then dropped off into the oil. In both cases the deposit of the potato slices into the hot oil foments a turbulent boil caused by water from the potato slices flashing into steam. This initiates the first stage in the cooking process wherein a pack 14 of potato slices, illustrated in FIGS. 6 and 7, is created and controlled and agitated for a designated time period at a designated cooking temperature within the volume of cooking oil maintained in the first stage 11. Carrying out the functions of control, agitation and mixing of the pack 14 are the control paddle units 24 and agitating paddle units 26 to be described more completely below. However it can be mentioned at this juncture that paddle units constructed as disclosed in copending U.S. patent application Ser. No. 12/150,856 filed Apr. 30, 2008, and assigned to the assignee of the present invention, are satisfactory for operation in the present invention. The disclosure of that patent application is thus incorporated herein by reference. The paddle units 24, 26 are each driven by independently controllable motors 27, FIG. 3, that communicate with a motor drive control 48, FIG. 16, so that the degree and direction of paddle rotation can be finely controlled to the objective of propelling the pack in a deliberate, time controlled manner through the stage.

Figure 5:
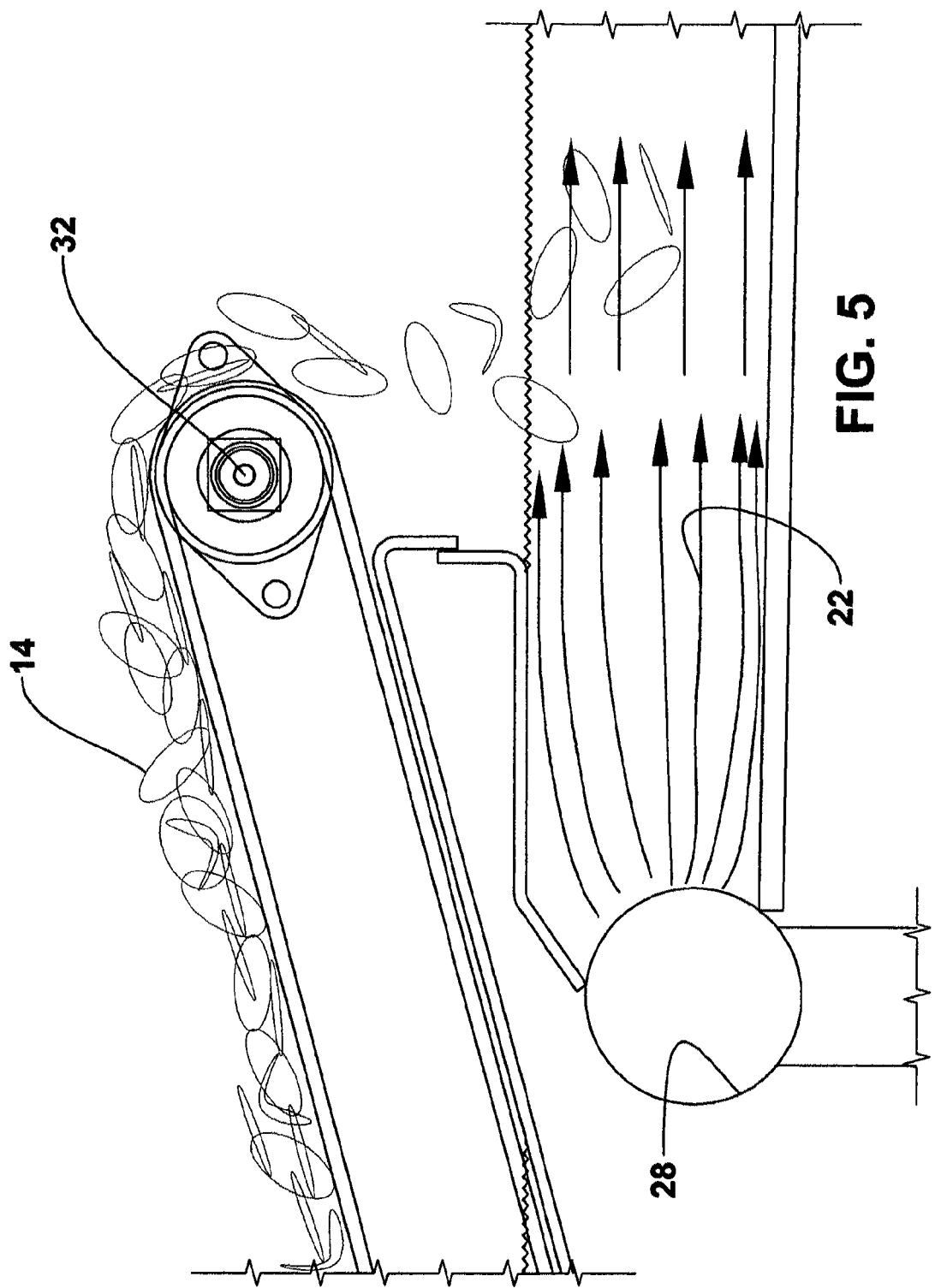
FIG. 5 is a greatly enlarged elevation view depicting the tumbling action of the chip pack during a typical transition between stages I to II and II to III.

The cooking oil 22 is pumped into the cooker pan 16 through an oil inlet 28 and is removed therefrom for recirculated heating and replenishment through an oil drain or discharge tube 29 positioned in a sump 31 disposed at the downstream end of the stage. An inclined potato chip takeout conveyor 32 of the movable belt type is arranged with a lower end positioned in the sump 31 and below the nominal cooking oil level in the stage, as indicated in FIG. 1A. The conveyor 32 is driven by a conveyor drive motor 33 (FIG. 3) regulated as to potato chip takeout speed and the potato chip pack dwell time by the motor drives controller 28 (FIG. 16) The pack of potato chips is moved progressively onto the takeout conveyor 32 through the combined action of the control paddles 24 acting in concert with, both fore and against, the current of cooking oil 22 being circulated in the pan through the oil inlet 28 and oil discharge tube 29. The takeout conveyor 32 serves to effect the transition of the potato chip pack 14 from one stage to another and propels the chip pack in a tumbling action, as illustrated in FIG. 5, into the next successive stage. This free falling tumbling action causes a further agitation and mixing of the cooking potato chip pack just as it enters the next cooking stage, Stage II.

Stage II (12) shown clearly in FIG. 1B, includes apparatus similar to that described above regarding Stage I (11) and these will be marked with primes ('). More particularly, the stage 12 includes its own discrete volume or bath of cooking oil 22', separate from that in Stage I, control paddle units 24', mixing and agitating paddle units 26'. A hot oil inlet 28' and oil discharge 29', sump 31', and takeout conveyor 32' are all present in stage 12. It will be understood however the foregoing are variable from those in Stage I in paddle rotational speeds, oil volume and temperatures as well as the pack dwell time in Stage II. This permits a very fine and tight control over the cooking of the pack of potato chips which in this stage 12 may be the same as or substantially different from those parameters set into the controls (FIG. 16) for Stage I. The pack of potato chips is mixed, agitated, controlled and propelled through Stage II and urged onto the takeout conveyor 32' for transfer in a tumbling action to the next cooking stage, Stage III (13) shown in FIG. 1C.

Although three stages for cooking a pack of potato chips are illustrated and described herein, it may be desirable for certain potato chip cooking applications to adopt fewer than three stages or more than three stages depending on the qualities and quantities desired in the end product. Stage III (13) includes apparatus similar to that described above concerning Stages I and II (11 and 12) and these will be marked with double primes (") as shown in FIG. 1C. More particularly, the stage 13 includes its own discrete volume or bath of cooking oil 22", separate from those in Stages I or II, control paddle units 24", mixing and agitating paddle units 26". A hot oil inlet 28" and oil discharge 29", sump 31", and takeout conveyor 32" are all present in stage 13. It will be understood however the foregoing are variable from those in Stages I or II in rotational speeds, oil volume and temperatures as well as dwell time in either stages. This configuration permits a very fine and tight control over the cooking of the pack of potato chips, which in this stage 13, may be the same as or substantially different from those parameters set into the controls (FIG. 16) for Stages I or II. The pack of potato chips 14 is mixed, agitated, controlled and propelled through Stage III and, as shown in FIG. 7, urged onto the takeout conveyor 32" for transfer and discharge in a tumbling action on to any subsequent treatment step (not shown) such as seasoning, inspection and packaging or the like such as is well understood in the field.

Figure 4:
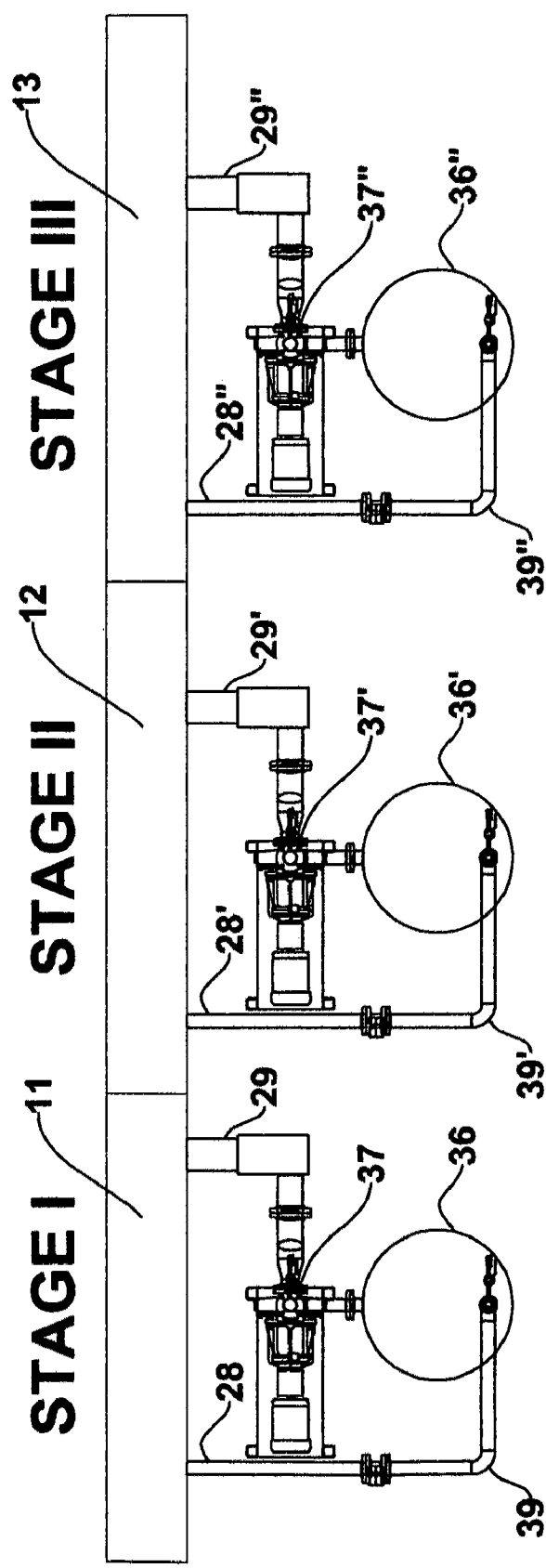
FIG. 4 is a schematic illustration of the independent cooking oil heating and circulation systems for each of the 3 stages of this invention.
Figure 16:
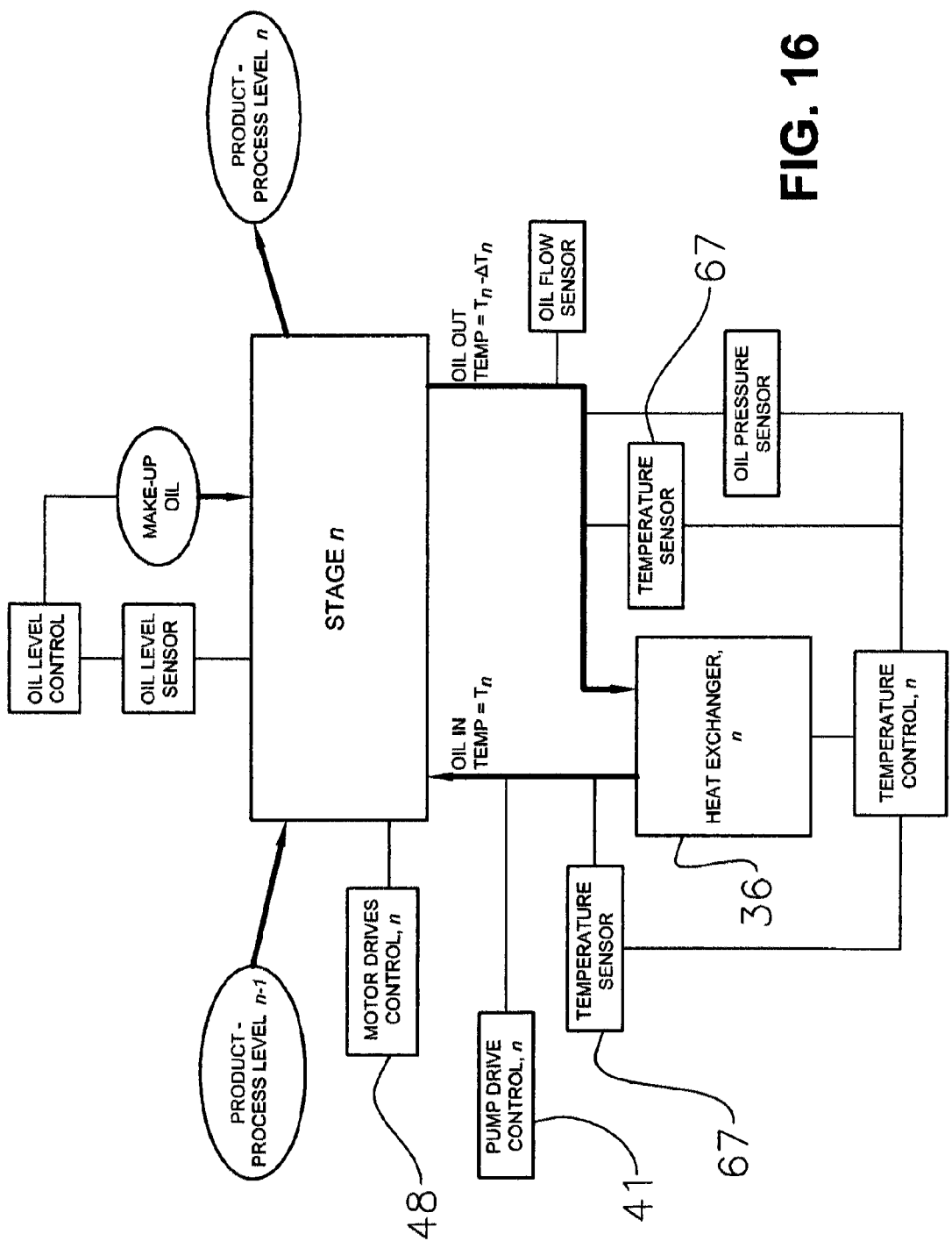
FIG. 16 is a general schematic illustration of the independent system of controls for each of the cooking stages of the present invention.

Referring particularly to FIG. 4, the cooking oil heating, circulating and replenishment systems are shown for the three individual stages 11, 12 and 13. Each system includes a heat exchanger 36, an oil circulating pump 37, control valves 38 and connecting piping 39. Referring now to FIG. 16, the control system 41 for circulating pump speeds, cooking oil temperatures, oil levels, oil volumes and makeup oil is disclosed in diagrammatic form to a degree of detail well understood by those skilled in the art such that no further description is deemed necessary.

FIGS. 6, 8A and 8B display a four blade, segmented paddle wheel 25 which is a more detailed representation of the paddle wheels indicated in FIGS. 1B, 1C and FIG. 2. Each of the four blades 43 is formed from gauge sheet metal which has been subjected to two treatments in a metal press-brake, hence the term two break blades. The breaks or metal bending deformations of the blade are each at an angle so that the tip or end of the blade 25 extends away from its base attachment location on the shaft 44. The space or slot 46 between adjacent blades segments 43 can be selected to be less that the nominal or general width of a potato thus discouraging potato slices passing through the slot or gap 46 while permitting cooking oil flow there through. Moreover, the paddle wheel unit 25 may be so positioned vertically in the cooker pan 16 such that the blade segments 43 are spaced from the pan bottom a distance precluding movement of potato slices beneath the blade segments 43. The breadth of the blades 43, while being effective in controlling and agitating the potato chip pack 14, also serves to restrain the tendency of the product to be carried freely by the flowing cooking oil. Hence the segmented blade paddle wheel impedes and assists in regulation of the flow of the potato chip pack 14 along the cooking path.

As indicated by the arrows 47 in FIGS. 1B, 1C, 6, and 8, the segmented paddle wheel 25 may be rotated in the clockwise and in the counter-clockwise directions. If we assume looking at FIGS. 1 and 2 that the potato chip pack 14 flows in the potato chip cooker 10 (the cooking path) from left to right, rotation of the segmented paddle wheel 25 in a counter clockwise direction serves to resist motion of the chip pack 14. When rotated in the clock-wise direction, the paddle wheel 25 serves to grab into the chip pack 14, stirring it and shifting some product into another position within the pack. Thus there are benefits in rotating the segmented paddle wheel 25 in a continuous rotational pattern as well as rotating in an oscillating, first one way then the opposite way, pattern. The result is vigorous agitation and mixing of the potato slices product within the pack 14 during the cooking operation.

FIGS. 9, 13 and 15 are illustrations of other multi blade segmented paddle wheels 25, 25', 25" and 25'" which are a more detailed disclosures of the paddle wheels 25 indicated in FIGS. 1 and 2. Each of the blades 49 is formed from gauge sheet metal which has been subjected to two or three treatments in a metal break, hence the term two or three break blades, all as described above in connection with blades 43. The eight blade configuration 25'" (FIGS. 13 & 15) can serve the basic functions described above in connection with the paddled wheel 25 but in this case one purpose of the eight-bladed paddle is to engage a smaller amount of the potato slice product 14. In other words, the smaller "pocket" between blades allows a smaller pack of product to be engaged and retained. This results in more frequent, smaller "batches" of product to be released as the paddle rotates downstream. Another feature is that the eight-bladed paddle is able to deliver a more aggressive action when engaging the potato chip pack as the paddle wheel 25'" rotates in the direction of product flow.

FIGS. 10 and 14 show two other forms respectively 51 and 52 of segmented paddle wheels, these with the presentation of finger-like blades or tines 53 extending radially from the central axle shaft 54 which is rotatable as indicated by the directional arrows 47. Each of these tines or blades 53 were bent so as to extend into at least three planes transverse to the shaft 54, having been subjected to at least three breaks during manufacture. When visualized In an end view it will be recognized that the tines or blades 53 take on an "S" curve configuration formed about the shaft 54. An important characteristic and function of the of the finger-like blades is that they afford a vigorous agitation and mixing of the potato chip pack promoting uniform contact with the cooking oil and eliminating clumps of stuck together product, an undesirable condition.

FIG. 11 shows in additional detail the paddle wheel 24 shown generally in FIGS. 1 and 2. Here the blades or flights 56 are mounted to extend at an oblique angle from the surface of a cylinder or drum 57. In operation the drum 57 serves a submerger function in pushing down upon the potato chip pack while the blades 56 work into the pack in a vigorous agitating manner. The drum is suitably mounted with respect to a central shaft 58 to be motor driven in the directions indicated by the arrow 47.

FIG. 12 shows in additional detail the paddle wheel 26 shown generally in FIGS. 1 and 2. Here the spaced apart blades or fingers 59 are generally rectangular in cross section and project radially outwardly from a central shaft 61 which may be rotated in the directions indicated by the arrow 47. In operation the paddle wheel 26 penetrates the potato chip pack 14 in a vigorous mixing and agitating action thereby encouraging mixing and further exposure of the uncooked chips to the hot cooking oil.

Figure 2A:
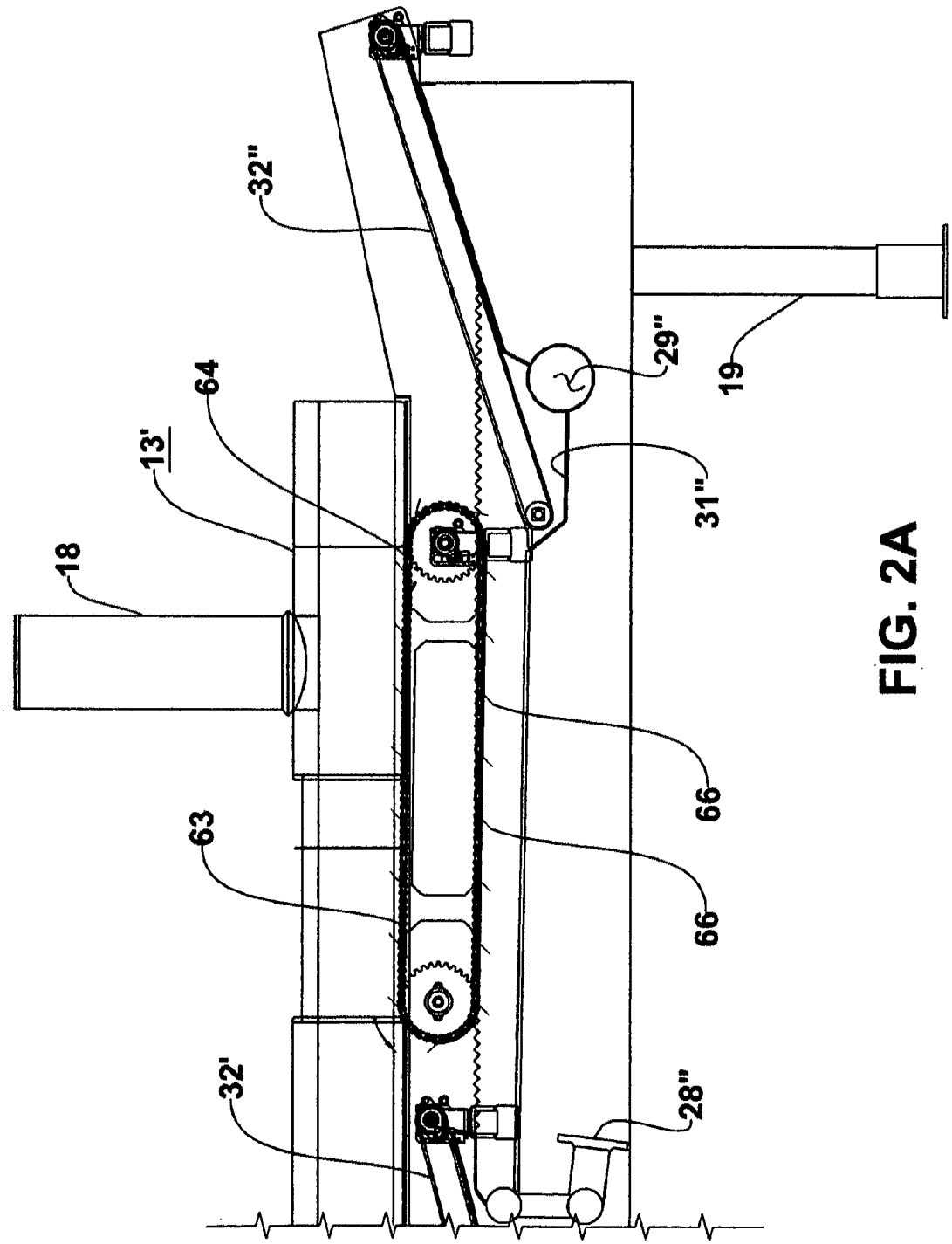
FIG. 2A is an enlarged view of the encircled portion designated 2A in FIG. 2 and showing details of the submerger conveyor.

Referring specifically to FIGS. 2 and 2A, there is shown in the Third Stage 13' a submerger conveyor unit 63 comprising a movable continuous belt 64 equipped with outwardly projecting laterally extending flights 66. The submerger is arranged in the cooker 10 with the lower run of the conveyor belt 64 disposed at the level of the cooking oil level or just there below so as to engage the pack 14 of potato chips and control movement of the pack towards the takeout conveyor 32". Thus the submerger conveyor 63 acts to maintain the potato chip pack 14 In intimate contact with the cooking oil so that a full cook may occur before removal of the pack from the cooker 10. The submerger conveyor is equipped to be driven in the direction of product movement through the cooker 10 thus enabling fine control over the cooking time of the chip pack.

Hard bite potato chips and the traditional potato chips, are both chip styles producible in the potato chip cooker 10 through practice of the processes disclosed herein. Precooking steps may be chosen as applied to the raw potatoes and these include the step of peeling the whole raw potato. However this step is sometimes omitted in order to achieve a particular potato chip texture and appearance post cooking. A further precooking step concerns washing the raw potato slices so as to remove unbound potato cells or starch particles broken during the slicing operation. Cooking raw washed potato slices results in a standard finished chip. Conversely, completely cooking raw, un-washed potato slices results in a finished hard bite chip, and those that derive from these two styles, are commercially accepted and desired in the marketplace and the present apparatus 10 is adapted to cook in the disclosed processes both washed and un-washed potato slices as well as the other styles of chips. Further enhancing the appeal quality of the cooked potato chip is the step of drying the chips in a suitable medium such as dry nitrogen, dry steam or the like.

The desired final moisture content of a cooked potato chip has been found to be in the range of about 1.2% to about 2.0% and this range can apply to either the hard bite chip or the standard, traditional chip.

The schematic control diagram, FIG. 16, illustrates the functional components that enable close regulation of oil temperatures and flow in each stage of the cooker 10 as well as the motor drive control 48. These enable regulation of the control paddles rotational speeds and directions so as to control and maintain the potato chip pack for the desired time in each stage of cooking. For example, in the first stage 11 the drive motor controls 28 enable a dwell time of the chip pack in a range of about 10 seconds to about 120 seconds. The cooking oil temperatures can be held in the range of 270° F. (132° C.) to about 410° F. (210° C.) in the first stage through action of the temperature sensors 67 coupled to the temperature control 68, as shown in FIG. 16. The motor drives control 28 enables the paddles to rotatably operate selectively from as slow as 1 rpm to as much as 100 rpm, the upper limit being to control the potato slices from becoming airborne and to retain the integrity of the pack.

Further, the foregoing components illustrated in FIG. 16 enable a potato chip pack dwell time in second stage 12, FIG. 1B, in the range of about 30 seconds to about 720 seconds. The cooking oil temperature can be maintained in the range of 220° F. (104° C.) to about 370° F. (188° C.).

Concerning the third stage 13, the components represented in FIG. 16 enable a potato chip pack dwell time of about 30 to about 120 seconds and the cooking oil temperature in the range of 220° F. (104° C.) to about 370° F. (188° C.). It should be understood that the capacity of the heat exchangers 36 for each stage are such as to enable control of the cooking oil temperature in each of the stages to be maintained at a temperature variation ($\Delta T$) in the range of about 2° F. (1.1° C.) to about 40° F. (22° C.).

In the multi-stage cooking of potato chips it is desirable to have as a goal a desired moisture content of the potato chip while still cooking at the end of each cooking stage. This is the process of incremental moisture reduction in the potato slice stage to stage. An exemplary goal is that at the end of first stage 11 and prior to entry of the second stage 12 via the take-out conveyor 32 the chip moisture content has been reduced in a range of about 10% to about 60%. Similarly, a goal is that at the end of the second stage 12, the moisture content of the slices can be reduced to a range of about 5% to about 35%. An achievable goal is that at the end of the third stage 13, the moisture content of the slices can reach the range of about 1.2% to about 2.0% by weight.

It will be readily apparent that various modifications may be made to the structures and processes of this invention and still be within the scope of the present invention. In particular, in may be readily appreciated by those skilled in this art from the above description that the apparatus according to the invention provides for adjustability not only in the available rotational speeds of the segmented paddle wheels but in the rotational directions as well or in the oscillation rate of the paddle wheels. This feature of adjustability accords with better cooking times and the resulting uniformity of the final product as to moisture content, quality and appearance. Accordingly, the scope of this invention shall only be limited within terms and spirit of the following claims.

What is claimed is:

1. A process for cooking potato chips of varying styles and types in cooking oil, comprising the steps: providing a cooker equipped to contain at least three separate cooking oil baths comprising distinct cooking stages, each stage being equipped with independently programmable controllable oscillating mixing means, oil heating, oil circulating and temperature control means;

introducing a volume of uncooked potato slices into the first cooking stage so as to develop a layer of uncooked slices in the cooking oil bath of the first stage;

vigorously agitating in a double action of oscillating mixing and stirring the uncooked potato slices by alternately pushing the slices forward and then holding them back in the cooking oil so as to develop a pack of potato slices and maintaining the slices in the first stage for a predetermined dwell time before transferring the slices from the cooking oil in the first cooking stage;

transferring the potato slices from the first cooking stage to the second cooking stage in an agitating tumbling action;

subjecting the slice pack in the second cooking stage while to a vigorous double action of oscillating mixing and stirring the slice pack by alternately pushing the slices forward and then holding them back in the cooking oil while maintaining the pack therein for a second predetermined dwell cooking time different from the first dwell time;

transferring the potato slice pack from the second cooking stage to the third cooking stage in an agitating tumbling action;

subjecting the slice pack in the third cooking stage to another vigorously double action of oscillating mixing and stirring the slice pack by alternately pushing the slices forward and then holding them back in the cooking oil while maintaining the pack therein for a third predetermined dwell cooking time different from the first dwell time; and then in a continuous manner removing the slice pack from the third cooking stage.

2. The potato chip cooking process of claim 1 and including the step of washing raw potato slices in water and then introducing the washed slices into the first cooking stage;

and programming for controlling the cooking times and oil temperatures in all cooking stages to produce standard style potato chips with the final moisture content in a range of about 1.20% to about 2.00%.

3. The potato chip cooking process of claim 1 and including the step of introducing unwashed raw potato slices into the first cooking stage;

and programming for controlling the cooking times and oil temperatures in all cooking stages to produce hard bite potato chips with the final moisture content in a range of about 1.20% to about 2.00%.

4. The potato chip cooking process of claim 1 where in the first stage the dwell time is in the range of about 10 to about 120 seconds and the cooking oil temperature is in the range of 270° F. to about 410° F.

5. The potato chip cooking process of claim 1 where in the second stage the dwell time is in the range of about 30 to about 720 seconds and the cooking oil temperature is in the range of 220° F. to about 370 ° F.

6. The potato chip cooking process of claim 1 where in the third stage the dwell time is in the range of about 30 to about 120 seconds and the cooking temperature is in the range of 220 ° F. to about 370 ° F.

7. The potato chip cooking process of claim 1 and including the step of maintaining within each of the stages the difference between incoming and outgoing cooking oil temperature ($\Delta T$) in the range of about 2° F. to about 40° F.

8. The potato chip cooking process of claim 1 where in stage one the cooking time serves to reduce the moisture content of the potato slices to a range of about 10% to about 60%.

9. The potato chip cooking process of claim 1 where in stage two the cooking time serves to reduce the moisture content of the potato slices to a range of about 5% to about 35%.

10. The potato chip cooking process of claim 1 where in stage three the cooking time serves to reduce the moisture content of the potato slices to a range of about 1.2% to about 2%.

11. The potato chip cooking process of claim 1 where in following treatment in the third stage, introducing the potato slices into a subsequent process from the group including vacuum frying, de-oiling and drying.

* * * * *